Feb. 20, 1962 F. G. DANHIER 3,022,415
GUN AND PROCESS FOR SEMI-AUTOMATIC ARC WELDING
Filed June 29, 1959 2 Sheets-Sheet 1

INVENTOR
Francois Georges Danhier
BY
ATTORNEYS.

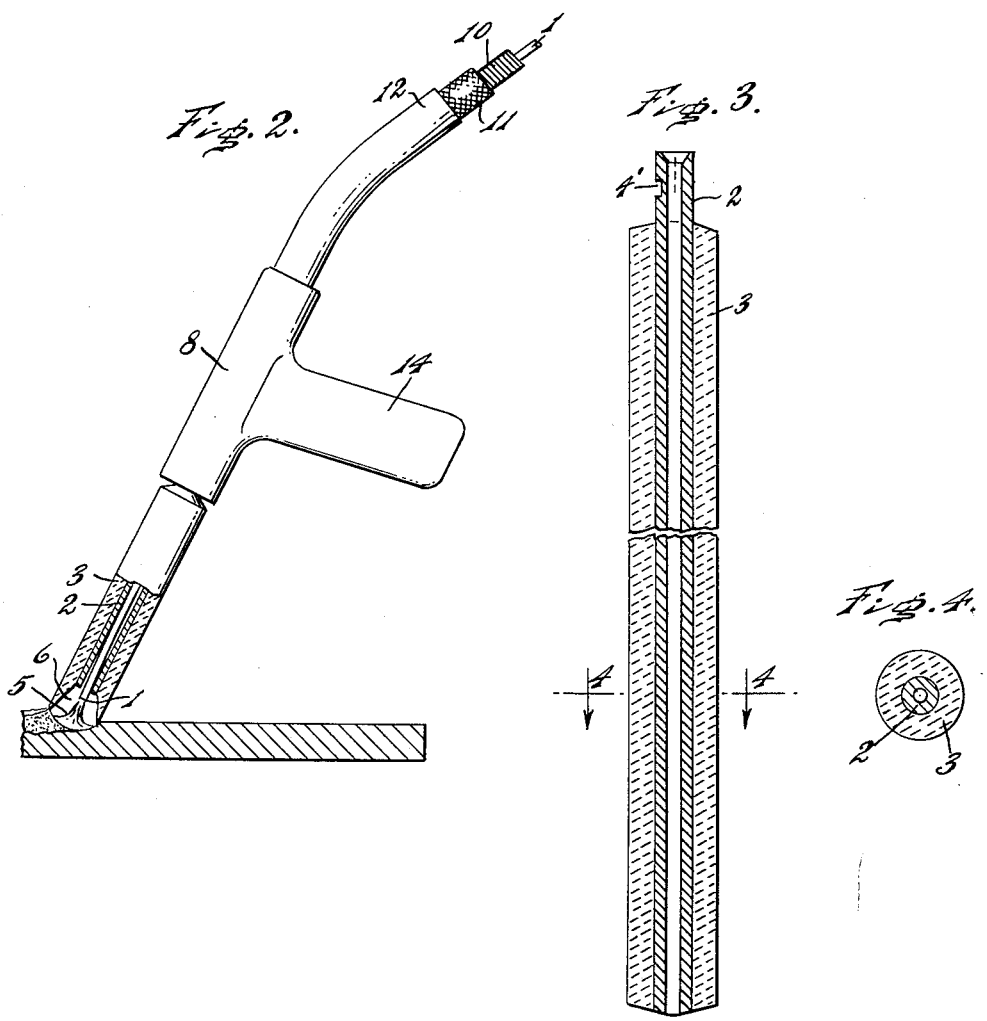

United States Patent Office 3,022,415
Patented Feb. 20, 1962

3,022,415
GUN AND PROCESS FOR SEMI-AUTOMATIC ARC WELDING
Francois Georges Danhier, Anderlecht, Belgium, assignor to La Soudure Electrique Autogene, S.A., Brussels, Belgium, a corporation of Belgium
Filed June 29, 1959, Ser. No. 823,494
Claims priority, application Belgium July 16, 1958
1 Claim. (Cl. 219—130)

The present invention relates to a gun for semi-automatic electric arc welding using a solid or composite continuous electrode, and comprising a fusible metallic tube which feeds the welding current to the electrode running through it.

Guns of this kind are known where the tube which brings the current to the electrode running through it in a continuous manner is a copper tube protected against destruction by the heat radiated by the arc and by the passage of the intense electric current required for welding, by means of internal circulation of a cooling fluid, generally water. Metallic projections generated from the weld pool freeze on the cooled end of the tube in guns of this type, and clog it up rapidly with a thick crust.

In the case of semi-automatic welding in an atmosphere of protective gas, the end of the tube wherefrom the electrode emerges is surrounded by a gas nozzle. When the spatter crust becomes thick, the gas passage is reduced and becomes insufficient. The operator must then interrupt his work to clean or to replace the current feeding tube.

Machines are also known for automatic welding, in which the electrode is pushed in a continuous manner by devices which are part of the machine's head, and which feed the welding current at the same time through a sleeve made of materials which generate, by their reaction, a protective gaseous atmosphere or a protective slag upon the weld pool, the thickness of said sleeve being sufficient for the speed of decomposition of its tip near the arc, due to heat radiated by the arc, to be substantially lower than the melting rate of the continuous electrode. This sleeve is assembled in a replaceable manner upon a support which can be moved with respect to the head of the machine, parallel to the axis of the electrode, in order to keep the distance between the work piece to be welded, and said sleeve, nearly constant despite the shortening of the latter. These sleeves are made mainly of carbon and they may contain slag-forming materials. The carbon is intended primarily to form, by contact with the air, carbon monoxide acting as a protective gas. Incidentally, the carbon provides to the sleeve some electric conductivity which can be possibly used to conduct a heating current feeding an auxiliary arc intended to even up the decomposition of the sleeve.

When using guns of this type, the electrode feeding means must be obtained through contacting elements located ahead of the sleeve, at a great distance from the electric arc. When the welding current is high, there is heating by resistance effect of the electrode wire before it reaches the arc.

Experience has shown that, under such conditions, the fusion of the wire proceeds with large drops, and the welding arc has only a very small penetration into the parts to be welded. This is why these guns can be used only with low welding currents.

On the other hand, the use of an auxiliary arc issuing from the carbon sleeve results in carburizing the weld metal and is harmful to the mechanical properties of the assembly.

The present invention covers a gun for semi-automatic welding in which the loss of metal by projections or spatter is substantially of lesser amount and is less harmful than in the case of a gun provided with a current-feeding tube which is cooled to prevent its deterioration, while permitting the use of much higher currents than the guns provided with consumable carbon sleeves. The gun of the invention offers in addition the advantage of being harmless to the quality of the weld deposit.

The gun as per the invention is characterized by having the metallic tube which feeds the welding current to the continuous electrode made of a replaceable, non-cooled tube of the same metal as the electrode, having a minimum thickness of two millimeters and being covered with a coating consisting mainly of mineral ingredients suitable for forming a liquid slag capable of protecting the pool of molten metal formed during the welding operation.

This non-cooled tube melts slowly at its tip under the action of the heat radiated by the arc.

The use of a thick current-feeding tube results in moving the end of the coating further away from the arc, creating at the tip a larger cup than the slight crater obtained with the consumable sleeves used in automatic welding machines. The substantial thickness of the current-feeding tube prevents also excessive heating, by resistance effect from the high welding current, thereby contributing to the preservation of a deep cup. Furthermore, the use, for this fusible tube, of the same metal as that of the continuous electrode which it must feed and guide laterally, also contributes to increase the deposition rate of the weld pool.

The metallic projections which are for the most part collected by the edge of the deep crater fall back in the weld pool when the coating melts, so that the tip of the gun wherefrom the arc issues does not require cleaning and most of the metal lost in spatter is recuperated.

Preferably, the thickness of the wall of said metallic tube should be greater than six tenths of the inside diameter of said tube.

The invention also covers a process for semi-automatic electric arc welding with a gun guiding a solid or composite continuous electrode provided with a metallic external surface, characterized by the radiation of the electric arc maintained between the work and the electrode causing the fusion of a metallic tube consisting of the same metal as the electrode and feeding the welding current to said electrode, said metallic tube being coated with ingredients capable of forming a slag over the weld pool.

Other features and details of the invention will appear from the description of the drawings attached to the present specification and which show schematically, and only by way of example, one form of execution of the gun for semi-automatic electric arc welding as per the invention.

FIGURE 2 shows this gun in action upon a horizontal plate to be welded, drawn in cross-section, as well as the tip of the gun.

FIGURE 3 is a longitudinal section to a larger scale of the contact element of the gun, before use.

FIGURE 4 is a section on the line 4—4 of FIGURE 3 of the contact element.

In all these figures, identical reference notations designate identical elements.

Figure 1:
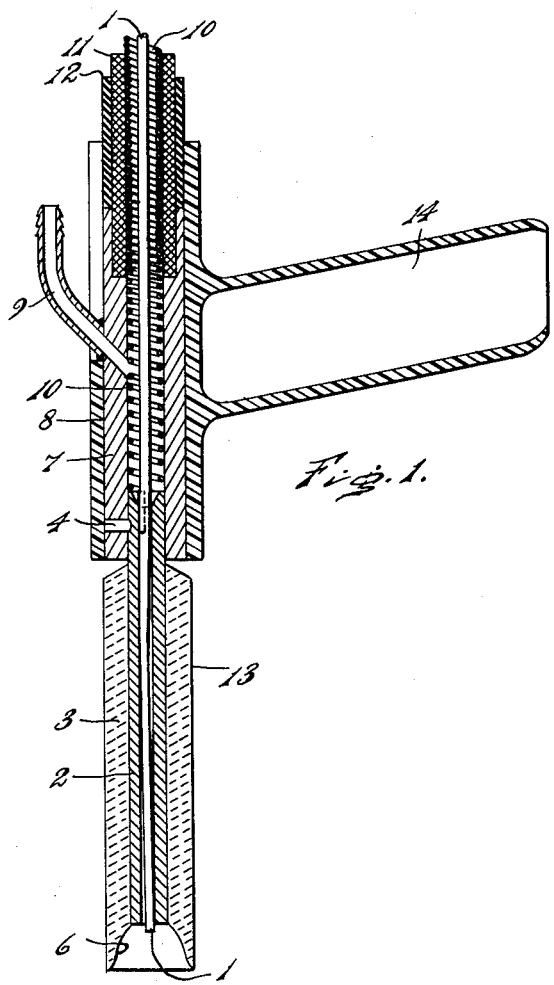
FIGURE 1 shows, in longitudinal section, a gun as per the invention, after completing a welding operation.

A wire 1 supplied by a spool, not shown, is the continuous electrode and is pushed continuously through the gun. This electrode is guided by a helical steel spring 10 enveloped by a copper braided cable 11 which is itself surrounded by a covering 12 of rubber or neoprene.

The body 7 of the gun is of copper. The welding current is fed to it by the copper cable 11. The gun body 7 is covered with an insulating shell 8 provided with a handle 14.

A hose inlet 9 brings the protective gas inside the body

7. Any suitable protective gas may be used, such as carbon dioxide or an inert gas such as helium or argon. The body is provided with a pin 4 which can engage a bayonet slot 4' (see FIGURE 3) of an iron tube 2. This tube 2 is firmly held against the body by this type of attachment, which also provides a good contact for the current. The same tube 2 also feeds the current to the wire 1. The wire 1 may be a solid wire, for example of steel, or it may be a tube provided with a flux core. The electrode and the tube are of the same metal.

At the spot where the protective gas enters the body 7, the turns of the wire-guiding spring 10 are spaced in order to facilitate the passage of the gas toward the inside of tube 2.

A coating layer 3 of the kind intended to form a slag over the weld pool is provided around the tube 2. The tip 6 of this coating has melted from the heat radiated by the arc 5 (see FIGURE 2). As shown in 6, this molten tip is shaped as a deep cut.

When the bare electrode 1 is pushed through the spring wire-guide 10, the body 7 and the contact tube 2, it waves in the cylindrical passage which guides it, because of its natural curvature, and it rubs in particular against the wall of tube 2, especially at the end of the latter. Most of the electric welding current transfers from the body 7 to the contact tube 2, and then from the tube to electrode 1. The arc strikes from the latter at a very short distance from the metallic end of the contact tube. The heat radiated by the arc is for the most part absorbed by the end of the contact tube and by its coating.

The tube is further heated by resistance effect from the current passing through it.

At the beginning of the welding operation, the tip of the contact tube warms up first slowly and rapidly reaches the melting point. In turn, the coating 13 partially melts. Drops of liquid coating and of molten metal cling, and finally fall in the weld pool. The metal so provided increases the size of the weld bead, while the slag floats upon the weld pool, contributing thus to its protection.

Experience has shown that the consumption speed of the contact tube is reasonably small when the external diameter of the coating is more than five times the inside diameter of the metallic tube.

Experience has shown that the wall thickness of the metallic contact tube must be at least two millimeters and should preferably be equal or superior to 0.6 times the inside diameter of said tube to obtain a deep cup from a thick layer of coating.

The contact tube thus shortens during the operation. When it is nearly entirely consumed, it must be replaced by a new one.

To prevent too frequent a replacement, the volume and the thermal capacity of the coating must be increased. Therefore, materials are used for the coating, which possess a great specific heat and a great heat of fusion.

By incorporating in the coating a metallic powder having a composition similar to that of the metal to weld, the thermal capacity is increased while utilizing at best the heat radiated by the arc to melt metal which will become the weld bead.

In the case of the welding of steel, experience has shown that it is advantageous to include in the coating, besides the usual metallic deoxidizers, at least 25% in weight of iron powder, in order to reduce the speed of consumption of the contact element.

By its fusion, the coating brings to the molten pool ingredients capable of influencing the welding metallurgy or the electric characteristics of the arc. It can therefore play the same role as the coating of welding rods in manual arc welding. It can particularly contribute to deoxidize the molten pool. It can, by generating carbon dioxide when being heated, protect the molten metal against the atmospheric air. This latter effect is very noticeable as soon as the coating contains at least 5% in weight of mineral carbonates.

Very satisfactory results have been obtained with contact tubes 350 millimeters long, made of an iron tube having an outside diameter of 11 millimeters, an inside diameter of 4 millimeters, and carrying a coating 26 millimeters in diameter.

The coating had the following composition by weight:

| | Percent |
|---|---|
| Iron powder | 30 |
| Bentonite | 4.1 |
| Cellulose | 1.7 |
| $CaCO_3$ | 3.3 |
| $MgCO_3$ | 3.3 |
| China clay | 4.1 |
| Newberg chalk | 8.4 |
| Rutile | 23.3 |
| Potassium titanate | 1.7 |
| High-carbon ferromanganese | 2.5 |
| Ferro-titanium | 2.5 |
| Dry potassium silicate | 15 |

Welding was performed with a 3 millimeter low-carbon steel wire, using an alternating current of 600 amperes. The contact tube was consumed after 15 minutes.

In the case of semi-automatic arc welding with a protective gas, it is possible to conduct the protective gas through the hole of the contact tube, because the inside diameter is generally 1 or 2 millimeters larger than the diameter of the wire used as the electrode. There is therefore sufficient passage for the gas.

If the crater formed in the coating by fusion is sufficiently large, the protecting gas filling this cup protects efficiently the molten pool.

In order to keep the hand of the operator at a distance sufficiently long from the welding zone when the length of the contact tube has been reduced more and more, and has become very short, it is possible to devise a sliding action between the body of the gun and its handle, whereby the body could move forward with respect to the handle by actuating a trigger-lever located inside said handle.

In view of my invention and disclosure variations and modifications to meet individual whim or particular need will doubtless become evident to others skilled in the art, to obtain all or part of the benefits of my invention without copying the process and structure shown, and I, therefore, claim all such insofar as they fall within the reasonable spirit and scope of my claim.

Having thus described my invention what I claim as new and desire to secure by Letters Patent is:

A gun for semi-automatic electric arc welding, comprising a continuous, consumable ferrous electrode having a bare surface, a consumable uncooled ferrous tube surrounding the electrode, in contact therewith and guiding the electrode, a coating on the outside of the tube, said tube having a wall thickness of at least two millimeters and greater than six tenths of the inside diameter of the tube, the coating having an outside diameter of at least five times the inside diameter of the tube and having a composition containing at least 25 percent by weight of iron powder, the rest of the coating consisting of mineral material which forms a liquid slag capable of protecting a liquid metal pool formed during the welding operation, means for feeding welding current to the electrode through the tube, and means for introducing protecting gas into the tube, said tube having a great thermal capacity due to its wall thickness and said coating having a gerat thermal capacity due to its outside diameter and the presence of the iron powder.

References Cited in the file of this patent

UNITED STATES PATENTS

| | | |
|---|---|---|
| 2,121,693 | Henderson | June 21, 1938 |
| 2,497,629 | Rieppel | Feb. 14, 1950 |
| 2,868,951 | Shrubsall | Jan. 13, 1959 |